Oct. 24, 1967   B. D. POLLOCK   3,348,943
REFRACTORY METAL DISPERSION
Filed Aug. 27, 1965

INVENTOR
BERNARD D. POLLOCK
BY Henry Kolin
ATTORNEY

United States Patent Office
3,348,943
Patented Oct. 24, 1967

3,348,943
REFRACTORY METAL DISPERSION
Bernard D. Pollock, Los Angeles, Calif., assignor, by mesne assignments, to the United States of America as respresented by the United States Atomic Energy Commission
Filed Aug. 27, 1965, Ser. No. 483,367
6 Claims. (Cl. 75—204)

The invention described herein was made in the course of, or under, a contract with the United States Atomic Energy Commission.

This invention relates to a method for preparing a fine dispersion of particles of a refractory metal in a solid body. More particularly it relates to a method for preparing uranium carbide containing finely dispersed particles of a refractory metal, and the products obtained by this process.

Uranium carbide, particularly as stoichiometric uranium monocarbide, is of interest and of increasing importance as a nuclear reactor fuel. It has excellent thermal and dimensional stability at high temperatures and neutron fluxes and is capable of extended burnup before reprocessing. Further, uranium carbide, unlike other ceramic nuclear fuels such as uranium oxide, has very good thermal conductivity, approaching that of the metallic fuel composition.

However, in common with other nuclear fuels, fuel element swelling, i.e., a decrease in bulk density of the fuel, occurs under certain reactor operating conditions, leading to structural failure of the fuel elements early in the potential life of the fuel. This swelling phenomenon is believed to result from the formation of gas bubbles containing various fission products, such as krypton and xenon, within the fuel matrix. If the size of gas bubbles remains sufficiently small, approximately 400 A. or less, the surface tension of the matrix permits retention of the gas at high pressures, and swelling is greatly reduced. If, however, a large number of small bubbles agglomerates into a small number of large bubbles, serious swelling results.

It has been observed with metallic uranium fuels that gas bubbles nucleate preferentially at internal surfaces, such as on inclusions. Gas bubbles that are nucleated on a scale so fine that the average distance between nuclei is less than 1 micron grow only to sizes that do not produce swelling. From theoretical and practical considerations, it has been realized that if a dispersed precipitated phase is produced in the reactor fuel which has a particle density on the order of $10^{13}$ cm.$^{-3}$ and is stable at reactor fuel operating temperatures and under irradiation, this should prove satisfactory in eliminating swelling. Thus it has been observed with metallic uranium fuels that swelling due to 0.3 atom percent burnup is only 0.5 volume percent increase when the bubbles are spaced about 0.5 micron apart. This spacing is equivalent to a bubble concentration of about $10^{13}$ cm.$^{-3}$.

It is generally known that second-phase dispersions may be prepared by forming a supersaturated solid solution and subsequent annealing at an elevated temperature at which the solution is still highly supersaturated, but at which mobility of the precipitating species is great enough to permit nucleation and precipitation. Various heat-treatment schedules with binary and ternary metallic uranium alloys have been proposed in order to obtain this precipitated finely dispersed phase. One such schedule is shown in "Finely Dispersed Phases in Uranium-Molybdenum Ternary Alloys" by David Kramer, J. Nuclear Materials, 4, pages 281–286 (1961).

However, the problem of preparing finely dispersed phases in refractory base materials such as the binary inorganic compounds of refractory metals and electronegative elements, e.g., the carbides, nitrides, and oxides of the metals of the actinide series, is a difficult one, particularly because of the high temperatures required to effect solution in the refractory base materials. In addition, prior to solution, the material forming the second-phase dispersion must be incorporated in the base material, e.g., by hot pressing, arc melting or other powder metallurgical techniques. Thus the need exists for a simple and convenient process for forming second-phase dispersions in refractory base materials.

Accordingly, it is an object of the present invention to provide a general method for preparing a fine dispersion of particles of a refractory metal in a solid body.

It is another object to provide a simplified method for both incorporating a refractory metal in a base material and providing a fine dispersion of this refractory metal therein.

It is still another object to provide a method for preparing a fine dispersion of particles of a refractory metal in the carbides, nitrides, and oxides of the metals of the actinide series.

It is yet another object to provide a method for preparing a fine dispersion of particles of a refractory metal in uranium carbide.

It is still a further object to provide a nuclear fuel consisting of uranium carbide containing finely dispersed particles of a refractory metal of submicron size.

I have now unexpectedly discovered that, in attempts to incorporate substantially insoluble refractory metals in solid bodies by a zone-melting process, there is surprisingly obtained a dispersion of particles of submicroscopic size instead of the much larger particles ordinarily expected.

In accordance with a broad aspect of this invention, a refractory metal that is substantially insoluble in a solid base that is suitable for a zone-melting treatment may be incorporated in the solid base substrate as a fine dispersion of particles of submicron size by subjecting the solid body in contact with the refractory metal to a zone-melting treatment. The refractory metal may be prior incorporated in the solid body by a conventional powder metallurgical process.

In accordance with a preferred aspect of this invention, a fine wire or foil of a refractory metal is wrapped about a solid body suitable for zone-melting treatment. This body is then traversed with a source of heat to establish a moving molten zone therein, whereby the portion of refractory metal in contact with the molten zone becomes merged therewith. Upon cooling the body, a fine dispersion of particles of the refractory metal of submicron size is obtained in the substrate solid body.

In the more specific aspects of this invention, by employing the method of this invention, a uranium carbide fuel element is prepared containing finely dispersed particles of a refractory metal, these particles being of submicron size, between 0.05 and 1 micron, and having a particle density of at least $10^{12}$ cm.$^{-3}$. Tungsten is particularly preferred as the refractory metal forming a second-phase dispersion of submicron particles in uranium monocarbide.

For a more complete understanding of this invention, its objects, features, and advantages, reference should be had to the accompanying drawings in which.

Figure 1:
FIG. 1 is an electron photomicrograph of zone-refined uranium monocarbide.
Figure 2:
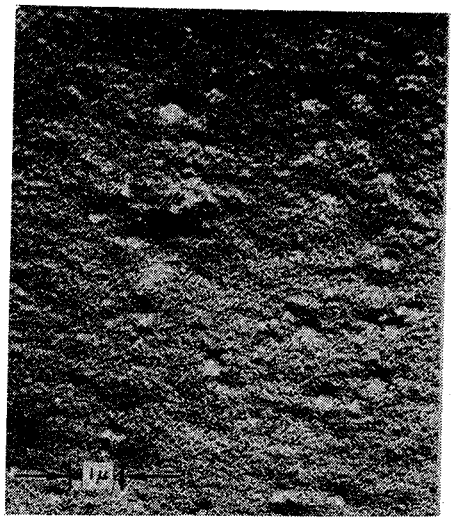
FIG. 2 is an electron photomicrograph of tungsten-doped uranium monocarbide containing 0.78 weight percent tungsten.
Figure 3:
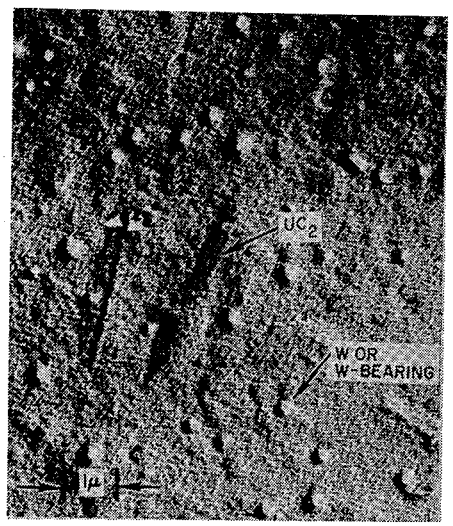
FIG. 3 is an electron photomicrograph of tungsten-doped uranium monocarbide containing 1.2 weight percent tungsten.

Referring to the figures, which are illustrative of a particularly preferred embodiment of this invention, there are shown three replica electron photomicrographs taken at a magnification of approximately 9000 diameters. A spacing of 1 micron has been scaled on each photograph. FIG. 1 generally serves as a control, and represents a purified sample of uranium monocarbide obtained by a zone-refining treatment. In FIGS. 2 and 3 are shown electron photomicrographs of surface replicas of samples of zone-melted uranium monocarbide doped with 1 weight percent and 2.5 weight percent tungsten, respectively. From these figures, it is apparent that the tungsten is present in the form of particles of about 0.2 micron in diameter and at a concentration of the order of $10^{12}$ particles cm.$^{-3}$. The sample shown in FIG. 3 is slightly hyperstoichiometric, containing an inclusion of $UC_2$.

The process of the present invention provides a convenient and rapid method for obtaining a second-phase dispersion of fine particles of a refractory metal in a solid body substrate amenable to and in a form suitable for zone-melting treatment. By the term "zone melting," reference is made to a method inclusive of either separation of or solute distribution by fusion in which one or more molten zones traverse a long charge of impure metal or chemical. This technique of zone melting is generally referred to as zone refining when used for purposes of purification of the substrate body, and as zone leveling wherein the objective is to distribute the solute uniformly throughout the purified material. Any of the well-known techniques utilized for zone melting processes may be employed in this invention. Thus, any of a variety of heaters may be used for the zone-melting processes provided they can form short molten zones that move slowly and uniformly throughout the charge. Inductance coils, ring-wound resistance heaters, or gas flames may be used. Similarly, it is immaterial whether the moving molten zone is produced by movement of the heater or by movement of the charge, the movement of a molten zone through the charge being all that is required.

The process of this invention may be utilized for preparing a fine dispersion of particles of a refractory metal in any solid substrate body that is amenable to and in a form suitable for zone-melting treatment. Conveniently, the body is in an elongated cylindrical or other suitable form for use with an induction zone melter; preferably, the refractory metal will be incorporated simultaneously with a zone-refining operation.

The substrate body may be any inorganic compound suitable for treatment by zone melting. An exemplary class of suitable compounds comprises the binary inorganic compounds of refractory metals and electronegative elements. A preferred group of these compounds includes the carbides, nitrides, and oxides of the metals of the actinide series. A particularly preferred material, because of its significance as an important reactor fuel, is uranium monocarbide.

The refractory metal is in contact with the substrate body. In one preferred aspect, the refractory metal is in the form of a wire wound uniformly on the substrate body, which is generally in the form of a fine rod. Alternatively, the refractory metal to be incorporated is in the form of a thin foil which can be wrapped around the rod. The term "wire" as used herein, unless otherwise indicated, as intended to embrace both wires of circular cross section as well as "flat" wires or thin foils. The wire diameter or foil thickness used and the total weight of material wound or wrapped about the substrate body will of course be a function of the relative dimensions of the body and the amount of refractory metal sought to be incorporated in the substrate body. For a representative rod sample between 2 and 5 inches in length and about ¼ inch in diameter, a 5-mil metal wire provides a convenient means of incorporating between about 0.2 and 10 weight percent of the refractory metal to be added. For such a sample, molten-zone traverse rates between 1 and 3 inches per hour are suitable.

The term "refractory metal" as used herein is generally intended to refer to those metals and their alloys having very high melting points, above the range of iron, cobalt, and nickel. These metals are generally those of Groups VB and VIB of the Periodic Table of Elements, although not limited thereto. Of particular utility in the practice of this invention are molybdenum, tungsten, rhenium, and chromium. Generally from 0.2 to 10 weight percent of the refractory metal will be incorporated in the substrate body depending upon the solubility considerations and the desired particle density. While the refractory metal will be substantially insoluble in the solid substrate base at application temperatures, e.g., at nuclear reactor temperatures for a tungsten-doped uranium carbide fuel element, solubility will still vary as a function of temperature. Also, the refractory metal may form insoluble reaction products with constituents of the solid base material.

The process of this invention will be particularly described with respect to the doping of uranium carbide with refractory metal dispersions because the products obtained thereby are of particular commercial utility, significance, and interest as non-swellable nuclear fuels. The use of the term "uranium carbide" generally refers to uranium monocarbide, which has a stoichiometric carbon content of 4.80 weight percent. However, this term is also intended to include hyperstoichriometric uranium monocarbide containing, e.g., 5.5 weight percent carbon, or hypostoichiometric uranium monocarbide containing, e.g., 4.2 weight percent carbon.

The following examples illustrate the practice of this invention but are not intended as limitations thereof.

EXAMPLE I

Rods of uranium carbide varying from ¼ to 7/16 inch in diameter were used. The carbon content varied from 4.2 to 4.8 percent by weight. A tungsten wire 5 mils in diameter was performed on a suitable mandrel into a helical coil somewhat less in diameter than the uranium carbide rod. The metal coil was then wound on the carbide rod at a turns-per-linear-inch ratio so as to give nominal weight percentages of 0.5 and 1 weight percent. A 5-mil diameter molybdenum wire was similarly wound about uranium carbide rods.

An induction zone melter was used to provide the molten zones. Traverse rates varying between 1 and 3 inches per hour were utilized. The slower traverse rate permitted higher volatilization of free uranium and also contributed to the efficiency with which excess uranium was swept out by the molten zone. All runs were conducted under one atmosphere of flowing, gettered argon.

For both the molybdenum and tungsten wires, reaction with the uranium carbide occurred readily, and in the solid state. As a given segment of the wire-wound uranium carbide approached the molten zone, i.e., approched the induction coil, the wire was observed visually to become diffuse. On closer approach, it lost its identity as a wire and merged with the uranium carbide. On completion of the zone-refining pass and after cooling, the exteriors of the rods containing either the molybdenum or tungsten showed no evidence of the additive.

EXAMPLE II

In another series of runs, three samples were prepared of hyper- and hypostoichiometric uranium carbide, with tungsten as the refractory metal forming the second-phase dispersion. Two of the uranium carbide rods were hyperstoichiometric, containing 5.2 weight percent carbon. These rods were wound with 5-mil tungsten wires calculated to give nominal amounts of 1.0 and 2.5 weight percent tungsten after zone refining. For the third run, a rod containing 4.7 percent carbon was first wound to give a 1 percent tungsten level; a second winding was added at the bottom of the rod to provide approximately a 2 percent tungsten concentration in the initial molten zone.

For the hyperstoichiometric sample containing nominal 1 weight percent tungsten, a concentration gradient varying from 0.96 to 1.22 percent was obtained. For the sample containing a nominal 2.5 weight percent, a concentration gradient varying from 1.75 to 2.68 percent was obtained.

Representative electron photomicrographs of the two runs using hyperstoichiometric uranium carbide are shown in FIGS. 2 and 3. From these photographs it is apparent that the tungsten is present as particles of the order of 0.2 micron in diameter and at a concentration of the order of $10^{12}$ particles cm.$^{-3}$.

It was found that the resulting tungsten-doped uranium carbide materials also had a greater hot hardness than undoped uranium carbide.

While I have described above the principles of my invention in connection with specific materials and processes, it is to be clearly understood that this description is made only by way of example and not as a limitation to the scope of the invention as set forth in the objects thereof and in the accompanying claims.

I claim:

1. The method for preparing a fine dispersion of particles of a refractory metal selected from the class consisting of tungsten, molybdenum, chromium and rhenium substantially insoluble in a solid substrate body of a material selected from the class consisting of carbides, nitrides, and oxides of the metals of the actinide series suitable for zone-melting treatment comprising providing said refractory metal in contact with said solid body, traversing said body with a source of heat to establish a moving molten zone therein, whereby said refractory metal in contact with said molten zone becomes merged therewith, and cooling said body to provide a fine dispersion of particles of submicron size of said refractory metal in said body.

2. The method according to claim 1 wherein said refractory metal is incorporated in intimate contact in said solid body by a powder metallurgy process prior to establishing said moving molten zone therein.

3. The method according to claim 1 wherein tungsten is the refractory metal and uranium carbide is the solid substrate body material.

4. The method according to claim 1 wherein molybdenum is the refractory metal and uranium carbide is the solid substrate body material.

5. The method for preparing a fine dispersion of particles of a refractory metal selected from the class consisting of tungsten, molybdenum, chromium and rhenium substantially insoluble in a solid substrate body of a material selected from the class consisting of carbides, nitrides, and oxides of the metals of the actinide series suitable for zone-melting treatment comprising wrapping a fine wire of said refractory metal about said substrate body, traversing said body with a source of heat to establish a moving molten zone therein, whereby said refractory metal in contact with said molten zone becomes merged therewith, and cooling said body to provide a fine dispersion of particles of submicron size of said refractory metal in said body.

6. The method for incorporating between 0.2 and 10 weight percent tungsten in a uranium carbide fuel element which comprises wrapping a fine tungsten wire around said uranium carbide element at a turns ratio sufficient to provide a preselected amount of tungsten between 0.2 and 10 weight percent, traversing said body with a source of heat to establish a moving molten zone of uranium carbide therein whereby a portion of said tungsten wire in contact with said molten zone becomes merged therewith, and cooling said body to provide a dispersion of tungsten particles of submicron size at a density of at least $10^{12}$ cm.$^{-3}$.

References Cited

UNITED STATES PATENTS

| 2,198,254 | 4/1940 | Koehring | 75—708 X |
| 2,898,249 | 8/1959 | Jensen | 148—1.6 |
| 2,990,261 | 6/1961 | Greiner | 148—1.6 X |

OTHER REFERENCES

David Kramer "Finely Dispersed Phases in Uranium Molybdenum Ternary Alloys," J. Nuclear Materials, 4, pages 281–286; (1961).

BENJAMIN R. PADGETT, *Primary Examiner.*

CARL D. QUARFORTH, *Examiner.*

S. J. LECHERT, Jr., A. J. STEINER,
*Assistant Examiners.*